(12) United States Patent
Kozyuk et al.

(10) Patent No.: US 9,290,717 B1
(45) Date of Patent: Mar. 22, 2016

(54) REACTOR FOR DEGUMMING

(71) Applicant: Arisdyne Systems, Inc., Cleveland, OH (US)

(72) Inventors: Oleg Kozyuk, North Ridgeville, OH (US); Peter Reimers, Shaker Heights, OH (US); Paul A. Reinking, North Olmsted, OH (US)

(73) Assignee: ARISDYNE SYSTEMS, INC., Cleveland, OH (US)

( * ) Notice: Subject to any disclaimer, the term of this patent is extended or adjusted under 35 U.S.C. 154(b) by 0 days.

(21) Appl. No.: 14/570,399

(22) Filed: Dec. 15, 2014

(51) Int. Cl.
*B01J 19/24* (2006.01)
*B01J 19/32* (2006.01)
*C11B 3/16* (2006.01)
*B01J 19/00* (2006.01)
*C11B 3/00* (2006.01)
*C11B 3/02* (2006.01)
*C11B 3/04* (2006.01)

(52) U.S. Cl.
CPC . *C11B 3/16* (2013.01); *B01J 19/32* (2013.01); *B01J 2219/00164* (2013.01); *B01J 2219/322* (2013.01)

(58) Field of Classification Search
CPC .......... B01J 19/00; B01J 19/24; B01J 19/215; B01J 19/32; B01J 2219/00049; B01J 2219/00164; B01J 2219/32; B01J 2219/322; C11B 3/00; C11B 3/02; C11B 3/04; C11B 3/16
See application file for complete search history.

(56) References Cited

U.S. PATENT DOCUMENTS

| 4,698,185 A | 10/1987 | Dijkstra et al. |
| 5,696,278 A | 12/1997 | Segers |
| 5,717,181 A | 2/1998 | Colgate |
| 5,810,052 A | 9/1998 | Kozyuk |
| 5,931,771 A | 8/1999 | Kozyuk |
| 5,937,906 A | 8/1999 | Kozyuk |
| 5,969,207 A | 10/1999 | Kozyuk |
| 6,001,640 A | 12/1999 | Loeffler et al. |
| 6,012,492 A | 1/2000 | Kozyuk |
| 6,035,897 A | 3/2000 | Kozyuk |
| 6,190,538 B1 | 2/2001 | Gosselink et al. |
| 6,426,423 B1 | 7/2002 | Copeland et al. |
| 7,135,155 B1 | 11/2006 | Long, Jr. et al. |

(Continued)

FOREIGN PATENT DOCUMENTS

| CA | 2644085 A1 | 9/2007 |
| RU | 2288948 C1 | 12/2006 |
| RU | 2333942 C1 | 9/2008 |

OTHER PUBLICATIONS

The International Search Report and Written Opinion issued in International Application No. PCT/US2014/070302; Mailing Date: Jul. 15, 2015.
Gogate et al., A review and assessment of hydrodynamic cavitation as a technology for the future; Ultrasonics Sonochemistry, 2005, vol. 12, pp. 21-27, Elsevier.
Gogate, et al., Cavitation: A technology on the horizon; Current Science, 2006, vol. 91, No. 1, pp. 35-46, Research Account.

(Continued)

*Primary Examiner* — Natasha Young
(74) *Attorney, Agent, or Firm* — Pearne & Gordon LLP

(57) ABSTRACT

A reactor is used for degumming vegetable oil to increase yield and reduce phosphatides. The reactor includes an annular obstruction with multiple circumferential spacers that form ring gaps around a center body having a tapered surface. The circumferential spacers and ring gaps form decompression stages for explosively mixing the oil with degumming agents. Impurities are transferred to the degumming agents and further separation of the components can be carried out to produce a refined oil product.

15 Claims, 2 Drawing Sheets

(56) References Cited

U.S. PATENT DOCUMENTS

| | | |
|---|---|---|
| 7,713,727 B2 | 5/2010 | Dayton et al. |
| 7,762,715 B2 | 7/2010 | Gordon et al. |
| 7,935,157 B2 | 5/2011 | Kozyuk et al. |
| 8,042,989 B2 | 10/2011 | Gordon et al. |
| 8,911,808 B2 | 12/2014 | Gordon et al. |
| 8,945,644 B2 | 2/2015 | Gordon et al. |
| 2009/0306419 A1 | 12/2009 | Myong et al. |
| 2012/0181216 A1 | 7/2012 | Kozyuk et al. |
| 2013/0062249 A1 | 3/2013 | Kozyuk et al. |
| 2014/0010725 A1 | 1/2014 | Hassan et al. |
| 2014/0087042 A1 | 3/2014 | Gordon et al. |
| 2014/0099687 A1 | 4/2014 | Gordon et al. |
| 2014/0363855 A1 | 12/2014 | Gordon et al. |

OTHER PUBLICATIONS

Gogate, et al., Engineering Design Methods for Cavitation Reactors II: Hydrodynamic Cavitation; AICHE Journal, 2000, vol. 46, No. 8, pp. 1641-1649.

Kumar, et al., Experimental quantification of chemical effects of hydrodynamic cavitation; Chemical Engineering Science, 2000, vol. 55, pp. 1633-1639, Pergamon.

Pandit, et al., Improve Reactions with Hydrodynamic Cavitation; Chemical Engineering Progress, May 1999, pp. 43-50, www.aiche.org.

Moulton, et al., Continuous Ultrasonic Degumming of Crude Soybean Oil; Journal of American Oil Chemists Society, Jan. 1990, vol. 67, No. 1, pp. 33-38, Springer.

Nano cavitation: a proven new concept; Processing & Technology, Aug./Sep. 2012, www.oilsandfatsinternational.com.

Greyt, et al., Use of Nano Reactors in Edible Oil Processing; 102end AOCS Annual Meeting, May 1-4, 2011, Cincinnati, Ohio Presentation, www.desmetballestra.com.

REACTOR FOR DEGUMMING

FIELD

The invention relates to an apparatus for refining oils, and more particularly, an apparatus for use in degumming vegetable oils having free fatty acids and phosphatides.

BACKGROUND

Vegetable oils are typically oils that have been pressed or extracted, such as from a vegetable source. Many vegetable oils contain some form of phosphatides (e.g., hydratable or non-hydratable), commonly known as gums. For instance, soybean oil contains about 1-3%, corn oil 0.6-0.9%, sunflower oil 0.5-0.9%, and canola oil (crude) 1-3% of gums.

Gums can be partially or totally removed from vegetable oils through several different known degumming processes, as described below. The most commonly used processes in the industry are water degumming, acid degumming, caustic refining and enzymatic degumming, for example, as disclosed in U.S. Pat. Nos. 4,049,686; 5,239,096; 5,264,367; 5,286,886; 6,001,640; 6,033,706; 7,494,676 and 7,544,820; and U.S. Pat. Pub. Nos. 2007/0134777; 2008/0182322 and 2012/0258017.

A method disclosed in U.S. Pat. No. 4,240,972 discloses adding an acid to a heated stream of crude vegetable oil. The oil stream is passed through a static mixer to produce an acid-in-oil dispersion having acid droplets and then the dispersion is separated into an oil phase and an aqueous phase containing the phosphatides. The static mixers for use in the process are commercially available under the trade-names Kenics Static Mixer, Komax Motionless Mixer, Series 50 In-Line Blender by Lightnin, Ross Motionless Mixers and Sulzer Static Mixer. These devices are tubular structures having fixed, mixing elements inside, which accomplish flow division and radial mixing, simultaneously. The static-mixer is sized to give a flow velocity of about 3 m/sec to 7.6 m/sec.

U.S. Pat. Nos. 4,698,185 and 6,0159,15 describe processes for degumming vegetable oil using a high shear Ultra-Turax rotor/stator apparatus. Similarly, U.S. Pat. No. 6,172,248 describes improved methods for refining vegetable oils and byproducts thereof. In an organic acid refining process, vegetable oil is combined with a dilute aqueous organic acid solution and subjected to high shear to finely disperse the acid solution in the oil.

U.S. Pat. No. 8,491,856 describes a system for stripping fatty acids from triglycerides containing a high shear device with a rotor, and wherein the rotor is rotated at a tip speed of at least 22.9 m/s (4,500 ft/min) during formation of the dispersion.

In yet another example, up to 99% phospholipids can be removed from soybean oil by an ultrasonic reactor (Moulton, K. J., Mounts, T. L., "Continuous ultrasonic degumming of crude soybean oil," Journal of the American Oil Chemists' Society, 67, 1990, 33-38).

A method disclosed in U.S. Pat. Application No. 2009/0314688; 2011/0003370 and 2014/0087042 involves mixing crude oil with degumming agents, i.e., water or acid, and passing the mixture through a hydrodynamic cavitation device. Numerous flow-through hydrodynamic apparatuses are known, for example, U.S. Pat. Nos. 5,810,052; 5,971,601; 5,969,207; 6,035,897; 6,502,979; 6,705,396; 7,338,551 and 7,207,712. Cavitational processing of oils provides high shear to the degumming process, but such processing suffers from extracting dissolved gases from liquids by generating post cavitation gas fields of tiny bubbles in the oil flow. Those bubbles result in a flotation process for the soap stock particles and can entrap oil in the larger agglomerates, which can increase oil yield losses.

Accordingly, there is a continuing need for reactor for degumming, which can provide high shear to the process and eliminate undesirable degassing problems.

SUMMARY

Disclosed herein is a reactor for degumming oil that includes a housing having a flow path. The flow path has a surface and an upstream portion for receiving oil and a downstream portion for receiving processed oil. The housing further includes an annular obstruction having an opening for permitting oil to flow through the reactor. The annular obstruction is attached to the surface of the flow path for reducing the cross-sectional area of the flow path. A frusto-conical body or a portion thereof is positioned in the opening of the annular obstruction. The frusto-conical body has a surface facing the annular obstruction and it is positioned along the centerline of the flow path of the housing. The annular obstruction further includes two or more circumferential spacers in series positioned around the surface of the frusto-conical body. The two or more circumferential spacers in series positioned around the surface of the frusto-conical body form ring gaps around the surface of the frusto-conical body for guiding oil through the flow path. The cross-sectional area of each ring gap ($A_x$) is less than that of the next downstream ring gap ($A_{x+1}$) according to the following equation: $1.2 \leq A_{x+1}/A_x \leq 1.4$, where $x=1, 2, 3$.

The frusto-conical body can have a gradually increasing circumferential diameter along its surface in a direction towards the downstream portion of the flow path. Optionally, the frusto-conical body can be mounted on shaft for moving the frusto-conical body along the centerline of the flow path of the housing and within the annular obstruction. A mechanism can be attached to the shaft and provide a means or handle for an operator to move the shaft along the flow path.

The two or more circumferential spacers, such as three spacers in series, can have a surface that faces towards the upstream portion of the flow path of the housing, for example, in a direction perpendicular or substantially perpendicular to the fluid flow in the housing. The surface facing towards the upstream portion can form an angle between 90° and 100° with the surface of the frusto-conical body facing the annular obstruction. The two or more circumferential spacers also can have a surface facing towards the downstream portion of the flow path. The surface facing towards the downstream portion can form an angle between 50° and 80° with the centerline of the flow path of the housing or the center line of the body.

In one embodiment, the ring gaps formed by the two or more circumferential spacers and the frusto-conical body can be described as having a radial length or radial gap size, which is measured in a direction opposite or substantially opposite the fluid flow. The radial length of the ring gaps can be selected so that the ratio between a ring gap radial length and the next downstream ring gap radial length is in the range from 1.08 to 1.27. To measure the radial length, it can be the minimal distance between the innermost tip of a circumferential spacer, such as the knife edge, and the surface of the frusto-conical body facing the tip of the spacer. The radial length of the ring gaps is less than 4 mm.

In another embodiment, the ring gaps formed by the circumferential spacers also can be measured in thickness, or in the direction of the fluid flow. The spacers can have an angled knife edge wherein the thickness of the spacer can be measured from the beginning of the knife edge and the landing or end edge of the spacer. The spacers can have a knife edge that lands less than 1 mm in thickness as measured along the flow direction in the housing.

In yet another embodiment, a reactor for degumming vegetable oil in the absence of cavitation is disclosed. The reactor includes a tubular housing having a flow path, wherein the flow path has an upstream portion for receiving oil and a downstream portion for receiving processed oil. The tubular housing can have an annular obstruction for reducing the cross-sectional area of the flow path. The annular obstruction can include a series of two or more circumferential spacers in series, such as three spacers, wherein the two or more circumferential spacers each form a circular opening such that the diameter of the opening of each circumferential spacer increases as compared to the next downstream circumferential spacer. A body or a portion thereof is positioned in the circular openings of the two or more circumferential spacers in series. The body has a tapered surface that forms ring gaps between the two or more circumferential spacers and the tapered surface. The ring gaps provide a flow path for the vegetable oil and the cross-sectional area of each ring gap ($Ax$) is less than that of the next downstream ring gap ($Ax+1$) according to the following equation: $1.2 \leq Ax+1/Ax \leq 1.4$, where $x=1, 2,$ or $3$. The two or more circumferential spacers also have a surface facing towards the upstream portion of the flow path. The surface facing towards the upstream portion forms an angle between 90° and 100° with the tapered surface of the body positioned in the circular openings of the two or more circumferential spacers in series. The two or more circumferential spacers also have an angled surface facing towards the downstream portion of the flow path. The angled surface facing towards the downstream portion forms an angle between 50° and 80° with the centerline of the flow path through the upstream portion of the tubular housing.

The cross-sectional area of each ring gap ($Ax$) is preferably selected such that no cavitation is induced in the vegetable oil as the oil flows through the reactor.

In an embodiment, the body has a smooth tapered surface free of protuberances. For instance, the angle of the taper is constant along the tapered surface. The body having the tapered surface can be a conical or frusto-concial body having a smooth tapered surface.

DETAILED DESCRIPTION

Herein, when a range such as 5-25 (or 5 to 25) is given, this means preferably at least 5 and, separately and independently, preferably not more than 25. In an example, such a range defines independently not less than 5, and separately and independently, not less than 25.

The reactors described herein are for degumming oils, such as vegetable oils and plant-derived oils. The oil can be edible vegetable oil, animal fat or tallow, or oil from bacteria. The degumming process can remove impurities in the oil, such as free fatty acids and phosphatides. The reactors utilize explosive decompression energy to achieve effective degumming of the oils. The explosive decompression energy is achieved by the oil flowing through the circumferential spacers having a body displaced therein in the reactor. Cavitation is avoided in the degumming process with the use of the reactors.

Figure 1:
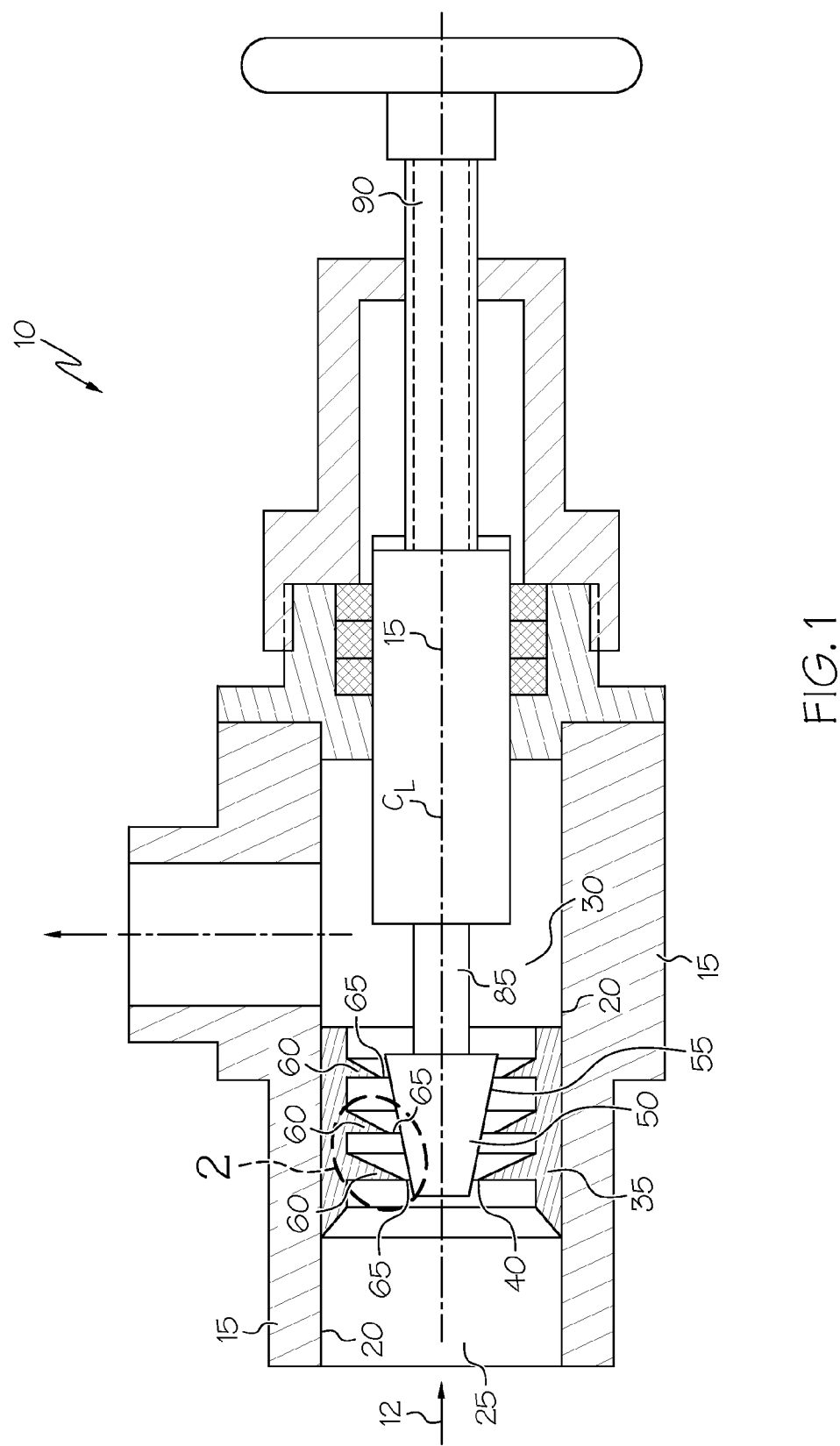
FIG. 1 shows a cross-sectional view of an example reactor for degumming oils.

Turning to the figures, illustrated in FIG. 1 is longitudinal cross-section of one embodiment of a reactor 10 that can be dynamically configured to generate one or more stages of decompression in a fluid and avoid cavitation during oil degumming.

In one embodiment, the reactor 10 includes a housing 15, such as a tubular housing as shown, having a centerline $C_L$ and a defined flow path with an inner surface 20. The walls of the housing define portions of the flow path, such as the upstream and downstream portions. The flow path guides fluid flow 12 through the reactor 10. The flow path can include an upstream portion 25 and a downstream portion 30. The upstream portion 25 receives oil or a mixture of fluids, for example oil and water or other degumming agents, and the downstream portion receives processed oil that has passed through obstructions in the reactor. The downstream portion 30 can be configured to direct the processed oil out of the reactor, for instance, to other reactors, a recycle loop or further processing steps. As shown, the upstream and downstream portions have a circular cross-section, however, it is appreciated that the housing 15 can take the form of other geometric shapes, including without limitation square, rectangular, hexagonal, octagonal or any other shape. Moreover, it will be appreciated that the cross-sections of the upstream and downstream portions of the housing 15 can be different from each other or the same, both in shape and cross-section.

The housing 15 includes an annular obstruction 35. The annular obstruction 35 can be fixedly attached to the surface 14 of the flow path. As shown, the leading edge of the annular obstruction 15, nearest the upstream portion 25, can have a tapered or angled face. The annular obstruction 35, having an opening smaller than the portion of the housing 15 directly upstream, such as 25, reduces the cross-sectional area of the flow path. The fluid is accelerated symmetrically about the centerline $C_L$ of the housing 15 as it flows through the annular obstruction 15.

The annular obstruction 15 includes two or more circumferential spacers, preferably in series. As shown, there are three circumferential spacers 60 in series. The spacers 60 extend inward towards the centerline $C_L$ of the housing 15 and each spacer 60 forms an opening, such as a circular opening as shown. The cross-section area of an opening formed by a spacer 60 preferably increases with each consecutive downstream spacer 60 to form a conical shaped series of openings. Thus, the opening formed by a downstream spacer 60 is larger than the opening of an upstream spacer 60. In an example, the circumferential spacers 60 can extend inward from the annular obstruction 35 in the form of an angled protuberance or knife.

The reactor 10 further includes body 50 having a tapered surface. The body 50 is a second obstruction for restricting fluid flow through the reactor 10. The body 50 can be a conical or frusto-conical shaped body. The body 50 can be arranged such that the gradually increasing circumferential diameter along its surface is in a direction towards the downstream portion of the housing 15. The body 50 or a portion thereof is positioned in one or more of the openings of the circumferential spacers 60.

FIG. 1 shows that the tapered surface 55 faces the circumferential spacers 60 and forms ring gaps 65, 65A, 65B between the tapered surface 55 of the body 50 and the innermost edge of the openings of the spacers 60. The ring gaps 65 provide a flow path for the oil to pass through the housing 15. The ring gaps 65 have a radial length that extends from the tapered surface 55 radially outward to the innermost edge or tip 70 of the opening of a spacer 60. The radial length of the ring gaps can be in the range of 0.5 to 4 mm, or 1, 2 or 3 mm.

The radial length of each ring gap 65 can be compared to the next downstream ring gap. Preferably, the ring gap is selected such that the ratio between a ring gap radial length and the next downstream ring gap radial length is in the range of 1.08 to 1.27.

A ring gap also can be characterized by its thickness. Thickness of a ring gap (e.g., 65, 65A, 65B) is measured along the flow direction of the oil in the housing or along the centerline. The thickness of the ring gap is the length measured from the leading upstream edge 66 of the tip 70 of the spacer 60 and the trailing downstream edge 67 where the spacer 60 extends from the annular obstruction 35. Preferably, the thickness of the ring gap is less than 1 mm. As shown, the spacers 60 can have a knife edge that lands less than 1 mm in length as measured along the flow direction in the housing.

Figure 2:
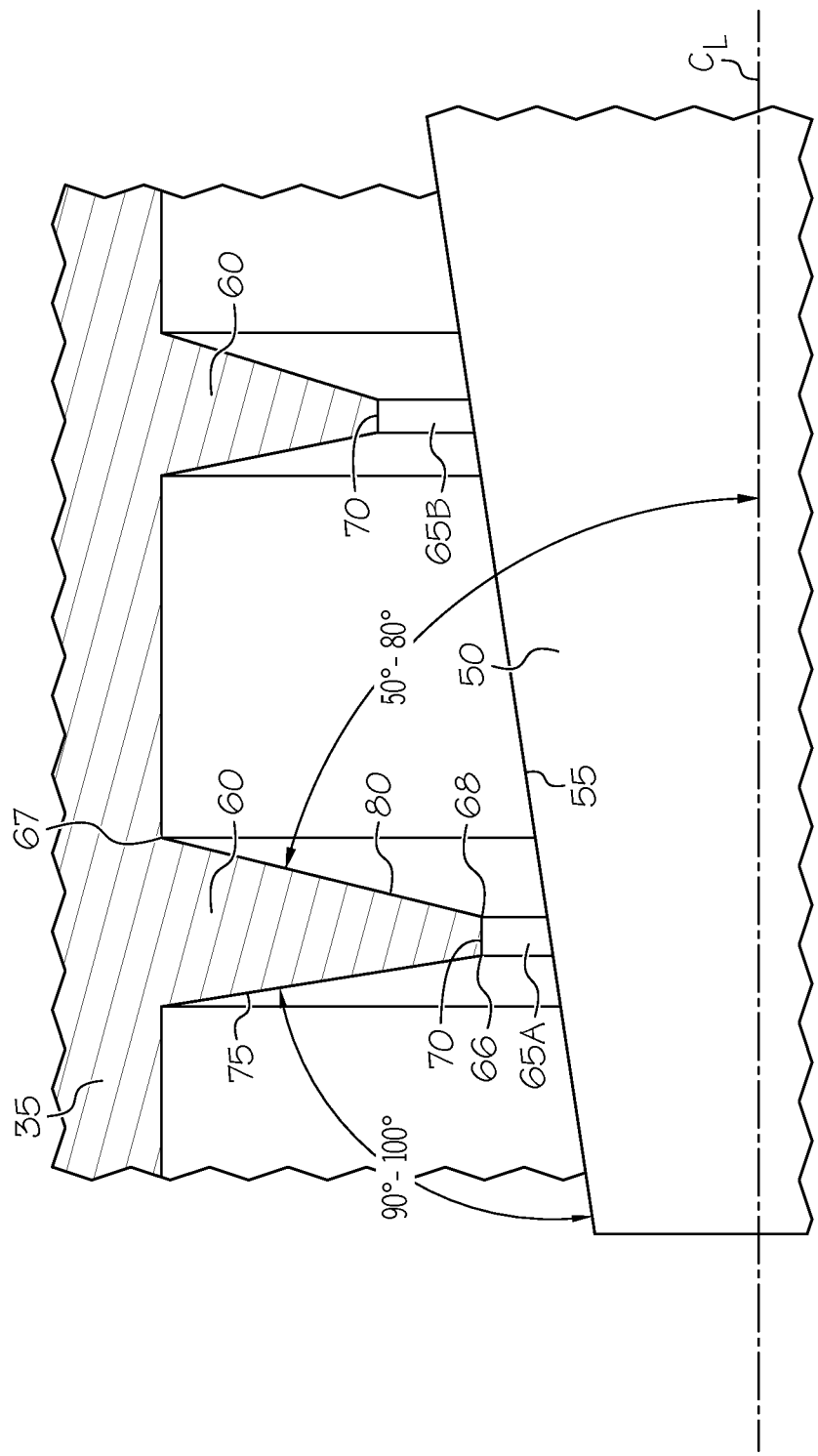
FIG. 2 shows a cross-sectional view of a portion of the example reactor of FIG. 1.

The ring gaps have a cross-sectional area available for permitting and guiding the oil to pass through the reactor for degumming the oil. The cross-sectional area (Ax) is measured at the smallest ring gap radial length. For example, as shown in FIG. 2, the cross-sectional area of the ring gap is measured at the downstream edge 68 of the tip of the spacer and extending radially inward to the surface of the body 50. Preferably, the cross-sectional area of each ring gap (Ax) is less than that of the next downstream ring gap (Ax+1) according to the following equation: $1.2 \leq Ax+1/Ax \leq 1.4$, where x=1, 2, or 3.

The cross-sectional area of the ring gaps can be fixed by the body 50 positioned in the openings of the circumferential spacers. In one embodiment, the size of the ring gaps can be adjustable. For example, the body 50 can be mounted on a shaft 85 for moving the body 50 along the centerline of the flow path of the housing 15 and within the openings of the spacers, wherein the annular obstruction and spacers are fixed within the housing. A mechanism 90 can be attached to the shaft for axially adjusting the body 50 in the housing 15. For example, the mechanism can be a handle and/or connector. Moving the body in the housing, for example along the centerline of the housing, can adjust the number of ring gaps that are formed in the annular obstruction. In this manner, the reactor can be dynamically configurable in multiple states in order to subject the fluid, such as oil mixed with degumming agents, to a select number of compression and decompression stages. For instance, the body 50 can be adjusted to form 1, 2, 3 or more ring gaps that the fluid can pass through.

In another embodiment, the circumferential spacers 60 can have a surface 75 facing towards the upstream portion of the flow path. The surface facing upstream can be perpendicular to the fluid flow or angled. As shown, the surface 75 is angled and tapered in a direction downstream of the fluid flow. The surface 75 facing towards the upstream portion 25 can form an angle between 90° and 100° with the tapered surface 55 of the body 50 positioned in the circular openings of the circumferential spacers 60. The circumferential spacers 60 also can have a surface 80, such as an angled surface, facing towards the downstream portion 30 of the flow path of the housing 15. The surface 80 facing towards the downstream portion can form an angle between 50° and 80° with the centerline of the flow path, for instance, as shown in FIG. 2.

The arrangement of the ring gaps, such as the number of gaps and the cross-section of the gaps, promotes effective degumming of oils such as vegetable oil. By passing through the ring gaps, the oil, in a pressurized state, is subjected to accelerated velocity in the ring gap and then explosive decompression upon exiting. For example, when a pressurized mixture of oil and degumming agents, such as water, acids, bases or mixtures thereof, pass through the ring gaps, the degumming agent fluid (e.g., aqueous acid and aqueous base droplets) are introduced into a reduced compression space in the ring gap. As the fluid exits the ring gaps, the degumming agents explosively burst into smaller droplets due to the increased speed within the gaps and the stark contrast of decompression upon exit. Discharge of the fluid through the ring gaps subjects the fluid to sudden reduction in pressure in the range of 0.1 MPa to 2 MPa. Selection of the ring gap size to control the reduction in pressure ensures that cavitation of the fluid is avoided and undesirable degassing problems are eliminated.

A decompression stage is formed after each ring gaps. The reactor 10 can have 1, 2, 3 or more decompression stages. The number of decompression stages can be equal to the number of spacers 60 present in the annular obstruction 35. Alternatively, the number of decompression stages can be adjusted by moving the body 50 in and out of the openings of the spacers 60 to increase or decrease the number of stages. As shown in FIG. 1, there are 3 decompression stages, each downstream of the ring gaps (e.g., 65A) and upstream of the next downstream ring gap (e.g., 65B).

The number of decompressions the oil is subjected to can be controlled by the number of passes of the oil through the reactor. For instance, the oil for degumming can be passed through the reactor at least 2, 3, 4 or 5 times, for example, by using a recycle loop external to the reactor. The oil for degumming can also be passed through multiple reactors, for example, 2, 3, 4 or 5 reactors in series.

Without being bound by any particular theory, it is believed that the acid in the fluid can react with the non-hydratable phosphatides impurities in the oil and decompose them. Degumming reagents, such as acid, can be diluted in aqueous solutions when mixed with oil. Thus, the reactor 10 described herein can produce a fine dispersion by subjecting the fluid to explosive decompression, which accelerates mass transfer of the impurities from the oil to the degumming solutions. One or more decompressions are preferred for forming fine dispersions of droplets in the oil. A fine dispersion is desirable when the degumming reaction has to be substantially completed and low residual phosphatide content has to be reached, for example, less than 10 to 50 ppm. Accordingly, the dispersion should be fine enough that the reaction between the degumming agent, such as acid, and the non-hydratable phosphatides is accelerated or at least substantially completed within seconds.

A fine dispersion is also desirable for a neutralization reaction with base. For instance, as aqueous base droplets decrease in size by the formation of a fine dispersion, the interface between the droplets and the oil will increase, and diffusion distances will decrease. These characteristics will increase the neutralization reaction.

Explosive decompression in the reactor also can promote self-oscillations of aqueous base and acid droplets, which can improve heat and mass transfer processes. Oil mixed with degumming agents is disrupted as it passes through the first ring gap wherein it has a pressure recovery step before the next ring gap. The resident time in the pressure recovery area downstream of the ring gap can range less than 0.01 seconds. This resident time period provides time to allow the non-hydratable phospholipids within a lipid matrix to migrate to an oil-water interface. At the same time aqueous acid and base droplets will coalesce, and the interface will decrease, diffusion distances will increase and the mass transfer processes will slow. Compression and explosive decompression steps can be repeated at least 3 times as described above. Repeating steps of compression and decompression (moving through the ring gaps) can promote gum formation, adsorption of metal-containing compounds and other reactions and processes to produce a refined, degummed oil.

It is understood that the reactors described herein can be used in processes for degumming oils. Oil for degumming can be introduced into the upstream portion of the housing 15 and then passed through the one or more ring gaps formed by the body 50 and spacers 60. To pass the oil through the reactor, it can be pumped, such as with a centrifugal or other high-pressure pump. Prior to entering the reactor, the oil can be mixed and agitated with one or more degumming agents. Successive compression and decompression stages can be induced by passing the oil through the ring gaps to transfer impurities out of the oil to the degumming agents mixed with the oil. The oil is then transferred to a downstream portion of the housing.

The number of compression and decompression stages formed by the ring gaps can be adjusted with an axially movable shaft being connected to a body positioned between the spacers in the housing. The process can include an adjusting step to increase or reduce the number of ring gaps the oil is passed through, for instance, 1, 2, 3 or 4 ring gaps. The adjusting step can be used to size the ring gaps to ensure the oil and/or degumming agents are not subjected to cavitation (cavitation is not induced in the reactor) as the fluid passes through the reactor.

The oil can exit the reactor and can be subjected to further processing steps, such as separating the oil from the other components in the mixture, such as degumming agents, by techniques known in the art, such as filtering, washing, extraction or centrifuging. The degummed oil can be recycled through the reactor prior to a separation step to produce a more refined oil product.

It will be understood that this invention is not limited to the above-described embodiments. Those skilled in the art having the benefit of the teachings of the present invention as hereinabove set forth, can effect numerous modifications thereto. These modifications are to be construed as being encompassed with the scope of the present invention as set forth in the appended claims.

What is claimed:

1. A reactor for degumming oil, the reactor comprising: a housing having a flow path, the flow path having an a surface and the flow path comprising an upstream portion for receiving oil and a downstream portion for receiving processed oil; an annular obstruction attached to the surface of the flow path for reducing the cross-sectional area of the flow path, the obstruction having an opening; a frusto-conical body or a portion thereof positioned in the opening of the annular obstruction, the frusto-conical body having a surface and being positioned along the centerline of the flow path of the housing; the annular obstruction having two or more circumferential spacers in series positioned around the surface of the frusto-conical body; and the two or more circumferential spacers in series positioned around the surface of the frusto-conical body form ring gaps around the surface of the frusto-conical body for guiding oil through the flow path, wherein the cross-sectional area of each ring gap (Ax) is less than that of the next downstream ring gap (Ax+1) according to the following equation: $1.2 \leq (Ax+1)/Ax \leq 1.4$, where $x=1, 2, 3$.

2. The reactor of claim 1, wherein the frusto-conical body having a gradually increasing circumferential diameter along its surface in a direction towards the downstream portion of the flow path.

3. The reactor of claim 1, wherein the two or more circumferential spacers having a surface facing towards the upstream portion of the flow path, wherein the surface facing towards the upstream portion forms an angle between 900 and 1000 with the surface of the frusto-conical body positioned in the opening of the annular obstruction.

4. The reactor of claim 1, wherein the two or more circumferential spacers in series positioned around the surface of the frusto-conical body having a surface facing towards the downstream portion of the flow path, wherein the surface facing towards the downstream portion forms an angle between 500 and 800 with the centerline of the flow path of the housing.

5. The reactor of claim 1, wherein the annular obstruction having three circumferential spacers in series positioned around the surface of the frusto-conical body.

6. The reactor of claim 1, wherein the ring gap having a radial length, the radial length of the ring gap is selected so that the ratio between a ring gap radial length and the next downstream ring gap radial length is in the range from 1.08 to 1.27, the ring gap radial length being the minimal distance between the innermost tip of a circumferential spacer and the surface of the frusto-conical body.

7. The reactor of claim 6, wherein the radial length of the ring gaps being less than 4 mm.

8. The reactor of claim 1, wherein the two or more circumferential spacers having a knife edge that lands less than 1 mm in thickness as measured along the flow direction in the housing.

9. The reactor of claim 1, wherein the frusto-conical body being mounted on shaft for moving the frusto-conical body along the centerline of the flow path of the housing and within the annular obstruction.

10. The reactor of claim 9, further comprising a mechanism for moving the shaft.

11. A reactor for degumming vegetable oil in the absence of cavitation, the reactor comprising: a tubular housing having a flow path, the flow path having comprising an upstream portion for receiving oil and a downstream portion for receiving processed oil; the tubular housing having an annular obstruction for reducing the cross-sectional area of the flow path, the annular obstruction comprising a series of two or more circumferential spacers in series, wherein the two or more circumferential spacers each form a circular 13 opening such that the diameter of the opening of each circumferential spacer with each consecutive downstream circumferential spacer; a body or a portion thereof positioned in the circular openings of the two or more circumferential spacers in series, the body having a tapered surface that forms ring gaps between the two or more circumferential spacers and the tapered surface, wherein the ring gaps provide a flow path for the vegetable oil, wherein the cross-sectional area of each ring gap (Ax) is less than that of the next downstream ring gap (Ax+1) according to the following equation: $1.2 \leq (Ax+1)/Ax \leq 1.4$, where $x=1, 2, 3$; and the two or more circumferential spacers having a surface facing towards the upstream portion of the flow path, wherein the surface facing towards the upstream portion forms an angle between 900 and 1000 with the tapered surface of the body positioned in the circular openings of the two or more circumferential spacers in series and the two or more circumferential spacers having an angled surface facing towards the downstream portion of the flow path, wherein the angled surface facing towards the downstream portion forms an angle between 500 and 800 with the centerline of the flow path through the upstream portion of the tubular housing.

12. The reactor of claim 11, wherein the annular obstruction having three circumferential spacers in series positioned around the tapered surface of the body.

13. The reactor of claim 11, wherein the cross-sectional area of each ring gap (Ax) being selected such that no cavitation is induced in the vegetable oil.

14. The reactor of claim 11, wherein the angle of the taper is constant along the tapered surface.

15. The reactor of claim 11, wherein the body having a tapered surface being a conical or frusto-conical body.

* * * * *

UNITED STATES PATENT AND TRADEMARK OFFICE
CERTIFICATE OF CORRECTION

PATENT NO. : 9,290,717 B1
APPLICATION NO. : 14/570399
DATED : March 22, 2016
INVENTOR(S) : Oleg Kozyuk, Peter Reimers and Paul A. Reinking Page 1 of 1

It is certified that error appears in the above-identified patent and that said Letters Patent is hereby corrected as shown below:

In the claims,

In Column 7, Line 67, Claim 3, please change "900 and 1000" to "90° and 100°"

In Column 8, Line 8, Claim 4, please change "500 and 800" to "50° and 80°"

Signed and Sealed this
Ninth Day of August, 2016

Michelle K. Lee
*Director of the United States Patent and Trademark Office*